United States Patent
Matsumoto

(10) Patent No.: US 12,125,226 B2
(45) Date of Patent: Oct. 22, 2024

(54) IMAGE PROCESSING DEVICE, THREE-DIMENSIONAL MEASUREMENT SYSTEM, AND IMAGE PROCESSING METHOD

(71) Applicant: OMRON Corporation, Kyoto (JP)

(72) Inventor: Shinya Matsumoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 379 days.

(21) Appl. No.: 17/638,536

(22) PCT Filed: Sep. 10, 2019

(86) PCT No.: PCT/JP2019/035512
§ 371 (c)(1),
(2) Date: Feb. 25, 2022

(87) PCT Pub. No.: WO2021/048917
PCT Pub. Date: Mar. 18, 2021

(65) Prior Publication Data
US 2022/0292703 A1     Sep. 15, 2022

(51) Int. Cl.
*G06T 7/593*       (2017.01)
*G01B 11/22*       (2006.01)
(Continued)

(52) U.S. Cl.
CPC .............. *G06T 7/593* (2017.01); *G01B 11/22* (2013.01); *G01S 17/89* (2013.01); *G06T 7/12* (2017.01);
(Continued)

(58) Field of Classification Search
CPC .......... G06T 7/50; G06T 7/586; G06T 7/593; G06T 7/521; G06T 7/12; G06T 2200/04;
(Continued)

(56) References Cited

U.S. PATENT DOCUMENTS

2010/0182406 A1* 7/2010 Benitez ..................... G06T 7/55
348/46
2015/0043808 A1  2/2015 Takahashi
(Continued)

FOREIGN PATENT DOCUMENTS

| JP | 2015035658 A | 2/2015 |
| JP | 2019502295 A | 1/2019 |
| JP | 2019138822 A | 8/2019 |

OTHER PUBLICATIONS

Park. "Using structured light for efficient depth edge detection." ScienceDirect. Image and Vision Computing. Nov. 1, 2008: 1449-1465. vol. 26, No. 11.
(Continued)

*Primary Examiner* — Jamares Q Washington
(74) *Attorney, Agent, or Firm* — ROSSI, KIMMS & McDOWELL LLP

(57) ABSTRACT

An image processor includes a map generator that generates a map being data including pixels each associated with depth-related information using an image captured with patterned light projected onto a target object, an edge detector that detects an edge of the target object using an image captured without patterned light projected onto the target object, and a corrector that corrects the map based on the detected edge to cause a discontinuous depth position to match a position of the edge of the target object.

10 Claims, 10 Drawing Sheets

(51) Int. Cl.
*G01S 17/89* (2020.01)
*G06T 7/12* (2017.01)
*G06T 7/521* (2017.01)
*H04N 13/128* (2018.01)
*H04N 13/218* (2018.01)
*H04N 13/254* (2018.01)
*H04N 13/282* (2018.01)
*H04N 13/00* (2018.01)

(52) U.S. Cl.
CPC ........... *G06T 7/521* (2017.01); *H04N 13/128* (2018.05); *H04N 13/218* (2018.05); *H04N 13/254* (2018.05); *H04N 13/282* (2018.05); *G06T 2200/04* (2013.01); *G06T 2207/10021* (2013.01); *G06T 2207/10028* (2013.01); *G06T 2207/20021* (2013.01); *H04N 2013/0081* (2013.01); *H04N 2013/0092* (2013.01)

(58) Field of Classification Search
CPC ........ G06T 2207/20021; H04N 13/128; H04N 13/254; H04N 13/282; H04N 2013/0081; H04N 2013/0092; G01B 11/22; G01B 11/25; G01S 17/89
USPC .................................................. 382/154, 266
See application file for complete search history.

(56) References Cited

U.S. PATENT DOCUMENTS

| | | |
|---|---|---|
| 2015/0371393 A1* | 12/2015 | Ramachandra ...... H04N 13/271 382/154 |
| 2017/0188002 A1 | 6/2017 | Chan |
| 2018/0061068 A1* | 3/2018 | Jiao ........................... G06T 5/77 |
| 2019/0156557 A1* | 5/2019 | Gordon ................ G06V 10/145 |
| 2021/0358157 A1 | 11/2021 | Ohnishi |

OTHER PUBLICATIONS

Partial Supplementary European Search Report issued in European Appln. No. 19944896.0 mailed Apr. 3, 2023.
International Search Report issued in Intl. Appln. No. PCT/JP2019/035512 mailed Dec. 10, 2019. English translation provided.
Written Opinion issued in Intl. Appln. No. PCT/JP2019/035512 mailed Dec. 10, 2019. English translation provided.
Vuylsteke. "Range Image Acquisition with a Single Binary-Encoded Light Pattern." IEEE Transactions on Pattern Analysis and Machine Intelligence. Feb. 1990: 148-164. vol. 12, No. 2. Cited in Specification.

* cited by examiner

IMAGE PROCESSING DEVICE, THREE-DIMENSIONAL MEASUREMENT SYSTEM, AND IMAGE PROCESSING METHOD

TECHNICAL FIELD

The present invention relates to an image processor, and more particularly, to a technique for obtaining accurate three-dimensional information from an image.

BACKGROUND

Active measurement is a method for obtaining three-dimensional (3D) information about an object using images (refer to Non-Patent Literature 1). Using patterned light projected onto the surface of an object, active measurement allows an object with less image features (e.g., an object with no texture on its surface) to undergo accurate 3D measurement and thus is more practical than passive measurement.

CITATION LIST

Non-Patent Literature

Non-Patent Literature 1: P. Vuylsteke; A. Oosterlinck, Range Image Acquisition with a Single Binary-Encoded Light Pattern. IEEE PAMI 1990, 12(2), 148-164.

SUMMARY

Technical Problem

However, active measurement tends to have lower measurement accuracy near the edge of an object. The height of an object is discontinuous at the edge, and also the projected pattern is discontinuous across the edge. Such discontinuity is likely to cause false pattern recognition near the edge, including false recognition of points on the object surface as points on the background, or conversely, points on the background as points on the object surface. This may cause an output of erroneous height information. FIG. 18 schematically shows the discrepancy between 3D information (point cloud data) obtained by active measurement and the edge (contour) of the actual object. In some areas, the point cloud lies out of the edge. Other areas lack the point cloud.

Depending on the use and purpose of the active measurement, such slight discrepancy (hereafter, simply measurement errors) between 3D information and the actual shape may not be negligible. For example, when the contour of an object is recognized through active measurement, and the recognition results are used for controlling the holding by a picking robot, a measurement error may cause failed picking or placing. More specifically, recognition of the contour of an object being larger than the actual size may cause an erroneous determination that the object has no space around it for a hand to be inserted, and the picking or placing operation is stopped. Conversely, recognition of the contour of an object being smaller than the actual size may cause interference between the hand and the object when the object is held. Additionally, when a member is fitted or installed with the position and the posture of an object being recognized through active measurement, positioning is to be performed with an accuracy of micrometers and may thus fail due to such a measurement error. For a member with a positioning mark (such as a protrusion or a groove) on its surface, the positioning mark cannot be recognized due to the difficulty in determining whether the surface irregularities in 3D information obtained through active measurement are positioning marks or irregularities resulting from measurement errors.

In response to the above issue, one or more aspects of the present invention are directed to a technique for eliminating or reducing the measurement error caused by false pattern recognition at the edge of an object.

Solution to Problem

An image processor according to a first aspect of the present invention includes a map generator that generates a map being data including pixels each associated with depth-related information using an image captured with patterned light projected onto a target object, an edge detector that detects an edge of the target object using an image captured without patterned light projected onto the target object, and a corrector that corrects the map based on the detected edge to cause a discontinuous depth position to match a position of the edge of the target object.

The map generated by the map generator has a depth reconstructed from the image captured with patterned light projected onto the target object, and may, in theory, include a measurement error caused by false pattern recognition. In contrast, information about the edge generated by the edge detector is obtained from the image captured without projected patterned light and may not include any error caused by false pattern recognition. Thus, correcting the map based on the position of the detected edge can eliminate or reduce the measurement error included in the map, producing a more accurate map than in known structures.

The map generator may generate the map in any manner. For example, the map generator may generate the map by stereo matching using a plurality of images captured from different viewpoints with patterned light projected onto the target object. Stereo matching is a method for calculating a depth using the principle of triangulation based on the parallax between two images captured from different viewpoints. Stereo matching allows accurate 3D measurement with a high spatial resolution. For stereo matching, the map may be a parallax map or a depth map.

The map generator may generate the map by a spatially encoded pattern technique using an image captured with patterned light projected onto the target object. The spatially encoded pattern technique is a method for calculating a depth using the principle of triangulation based on the relationship between camera pixels and the corresponding points on an encoded pattern, and can obtain 3D information from one image. The spatially encoded pattern technique allows high-speed and accurate 3D measurement. The spatially encoded pattern technique may use a depth map as the above map.

The map generator may include an obtainer that obtains an image pair of a first image and a second image captured from different viewpoints with patterned light projected onto the target object, a parallax predictor that predicts a parallax between the first image and the second image by a technique different from stereo matching, a definer that defines a search range for a corresponding point for stereo matching based on the predicted parallax, and a stereo matcher that performs stereo matching for the defined search range using the first image and the second image. In typical known stereo matching, the entire comparative image is searched for the corresponding points. Thus, high-resolution images unavoidably cause long time processing. In contrast, the above structure limits the search ranges for the corresponding points based on the predicted parallax. This greatly narrows the search ranges and shortens the time taken for the search for the corresponding points.

The parallax predictor may predict a parallax based on distance information obtained by a spatially encoded pattern technique. The spatially encoded pattern technique using an image sensing device having the same resolution as for stereo matching allows distance information to be obtained within a processing time much shorter than in stereo matching. The spatial resolution of ranging with the spatially encoded pattern technique is lower than with stereo matching but is sufficient for parallax prediction.

The map generator may further include a parallax map combiner that generates a combined parallax map by combining a plurality of parallax maps generated by the stereo matcher from a plurality of image pairs. In this case, the corrector may correct the combined parallax map, or a depth map resulting from conversion of the combined parallax map. The combination of the parallax maps obtained from the plurality of image pairs can reduce variations in measurement, thus allowing stable generation of an accurate and reliable map.

The parallax predictor may generate a plurality of predicted parallaxes. The definer may define a search range for the plurality of image pairs using a combined predicted parallax including the plurality of predicted parallaxes combined together. The predicted parallax may be generated (measured) multiple times in this manner, improving the accuracy and robustness.

The image captured without patterned light projected onto the target object may be an image captured with uniform light projected onto the target object. For example, a white uniform light source may be used.

A three-dimensional measurement system according to a second aspect of the present invention includes a sensor unit including at least a first projector that projects patterned light and one or more cameras, and the image processor according to the first aspect that performs processing using an image received from the sensor unit. This system can obtain 3D information in which the measurement error caused by false pattern recognition at the edge of the target object is eliminated or reduced.

One or more aspects of the present invention may be directed to an image processor or a three-dimensional measurement system including at least part of the above elements. One or more aspects of the present invention may be directed to an image processing method, a three-dimensional measurement method, a ranging method, a control method for an image processor, or a control method for a three-dimensional measurement system including at least part of the above processes, or may be directed to a program for implementing any of these methods or a non-transitory storage medium storing the program. The above elements and processes may be combined with one another in any possible manner to form one or more aspects of the present invention.

Advantageous Effects

The 3D measurement according to the above aspects of the present invention eliminates or reduces the measurement error caused by false pattern recognition at the edge of an object.

DETAILED DESCRIPTION

Example Use

Figure 1:
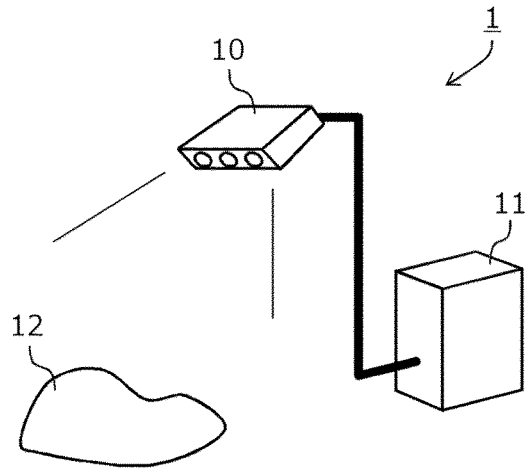
FIG. 1 is a schematic diagram of a 3D measurement system in an example use of the present invention.

FIG. 1 is a schematic diagram of a three-dimensional (3D) measurement system in an example use of the present invention. A 3D measurement system 1 measures the 3D shape of a target object 12 by image sensing. The 3D measurement system 1 mainly includes a sensor unit 10 and an image processor 11. The sensor unit 10 includes at least a first projector for projecting patterned light, a second projector for projecting unpatterned light, and one or more cameras (image sensing devices or imaging devices). The sensor unit 10 may also include another sensor or an illuminator as appropriate. An output from the sensor unit 10 is received by the image processor 11. The image processor 11 uses data received from the sensor unit 10 to perform various processes. The processes performed by the image processor 11 may include distance measurement (ranging), 3D shape recognition, object recognition, and scene recognition. The processing results from the image processor 11 are output to an output device, such as a display, or transferred to an external device to be used for inspection or control over another device. The 3D measurement system 1 has many uses including computer vision, robot vision, and machine vision. In particular, the 3D measurement system 1 according to the present disclosure can obtain accurate 3D information about the target object 12, and may thus be used to control various industrial robots that perform operations such as object picking, positioning, assembly, and inspection.

The structure shown in FIG. 1 is a mere example. The 3D measurement system 1 may have a hardware configuration designed as appropriate for its use. For example, the sensor unit 10 and the image processor 11 may be wirelessly connected to or integral with each other. The sensor unit 10 and the image processor 11 may be connected to each other through a local area network (LAN) or a wide area network (WAN) such as the Internet. Multiple sensor units 10 may be included in one image processor 11, or the output from one sensor unit 10 may be provided to multiple image processors 11. The sensor unit 10 may be attached to a robot or a movable object to have a movable viewpoint.

Measurement Process

Figure 2:
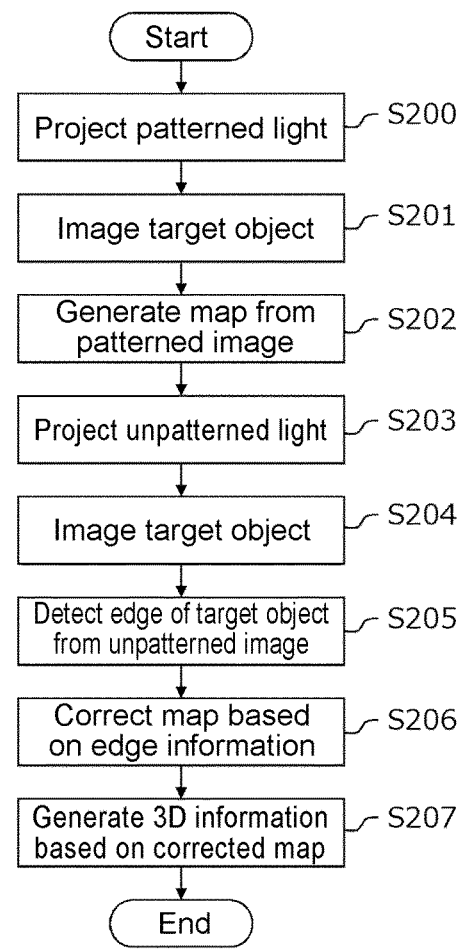
FIG. 2 is a flowchart of a measurement process performed by the 3D measurement system.
Figure 3:
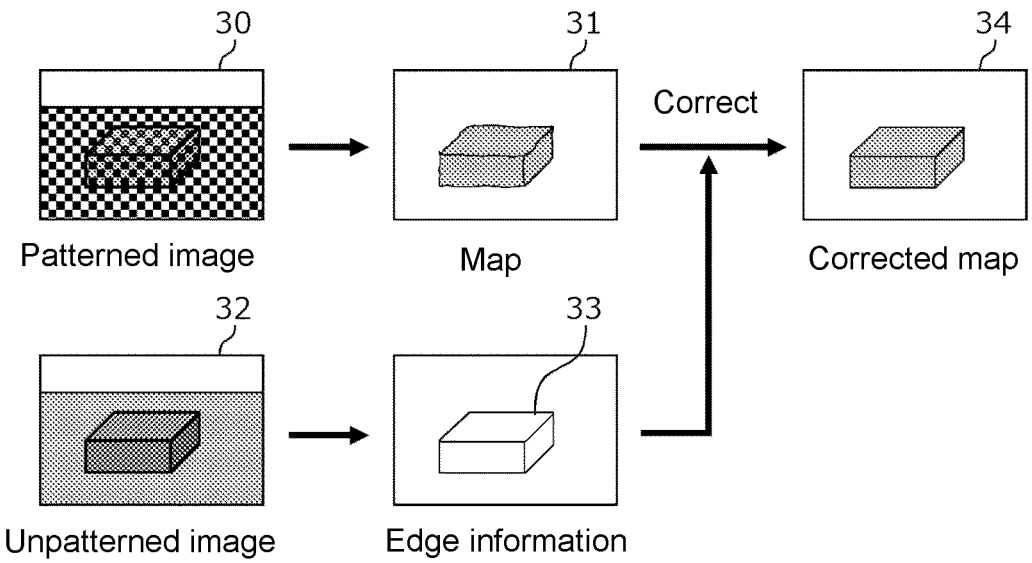
FIG. 3 is a schematic diagram of images and maps used in the measurement process.

A measurement process performed by the 3D measurement system 1 will now be roughly described with reference to FIGS. 2 and 3. FIG. 2 is a flowchart of a measurement process performed by the 3D measurement system 1. FIG. 3 is a schematic diagram of images and maps used in the measurement process.

In step S200, the sensor unit 10 (first projector) projects patterned light onto the target object 12. The patterned light may have a fixed pattern, a random pattern, or a striped pattern used in phase shifting. An appropriate pattern may be selected in accordance with the algorithm for reconstructing 3D information.

In step S201, the sensor unit 10 (camera) images the target object 12 while patterned light is being projected onto the target object 12, to produce an image 30 (hereafter also referred to as a patterned image, or an image on which a pattern is projected). The image 30 is received by the image processor 11.

In step S202, the image processor 11 (map generator) reconstructs 3D information from the patterned image 30 received in step S201 and generates a map 31 that is data including pixels each associated with depth-related information. The depth-related information may be a depth or information convertible into a depth (e.g., parallax information).

In step S203, the sensor unit 10 (second projector) then projects unpatterned light onto the target object 12. For example, the target object 12 may be illuminated with white uniform light. In a sufficiently bright environment, the target object 12 may not be illuminated.

In step S204, the sensor unit 10 (camera) images the target object 12 to produce an image 32 (hereafter also referred to as an unpatterned image, or an image on which no pattern is projected). The image 32 is received by the image processor 11.

In step S205, the image processor 11 (edge detector) uses the unpatterned image 32 received in step S204 to detect the edge of the target object 12. The edge detection may be achieved using any technique, such as a differential filter or a Laplacian filter.

In step S206, the image processor 11 (corrector) corrects the map 31 obtained in step S202 based on information about an edge 33 obtained in step S205. For 3D information reconstructed accurately in step S202, the discontinuous depth position in the map 31 matches the edge 33 detected in step S205. However, for reconstructed 3D information including an error due to false pattern recognition at the edge of the target object 12, a discrepancy occurs between the discontinuous depth position in the map 31 and the position of the edge. In step S206, the map 31 is corrected to cause the discontinuous depth position to match the position of the edge.

In step S207, the image processor 11 (3D information generator) generates output 3D information (e.g., point cloud data) based on a corrected map 34. The processing eliminates or reduces the measurement error caused by false pattern recognition, thus allowing generation of accurate and reliable 3D information.

Map Correction

Figure 4:
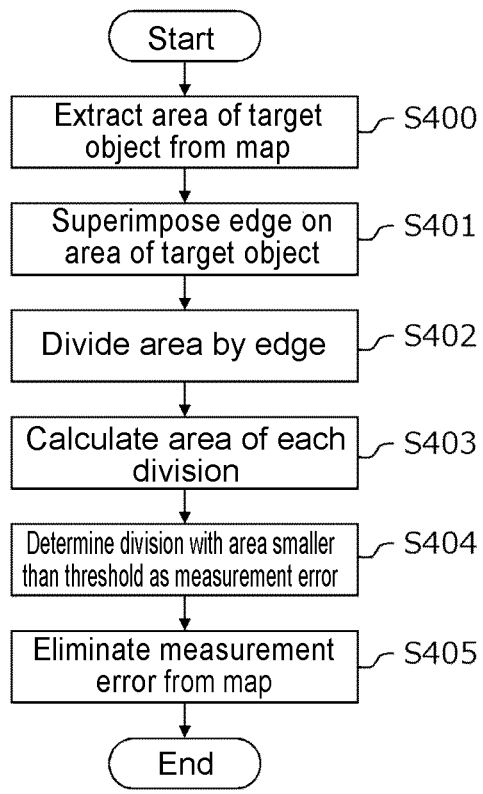
FIG. 4 is a flowchart of a map correction process performed by an image processor.
Figure 5:
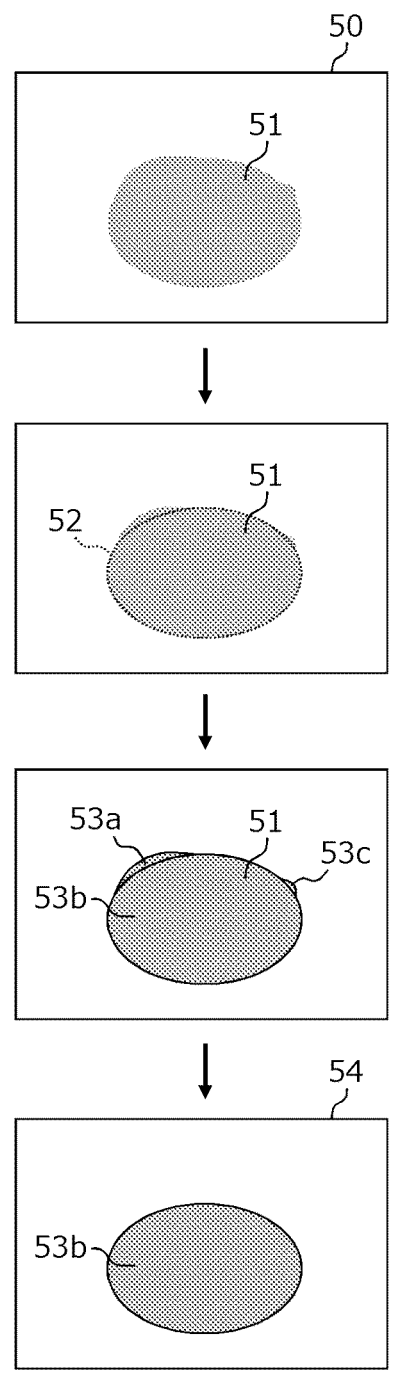
FIG. 5 is a schematic diagram of an example map correction process.

An example of the map correction process in step S206 will now be described in detail with reference to FIGS. 4 and 5. FIG. 4 is a flowchart of the map correction process performed by the image processor 11. FIG. 5 is a schematic diagram of an example map correction process.

In step S400, the image processor 11 segments a map 50 based on a depth and extracts an area 51 corresponding to the target object 12. Any segmentation method may be used. For example, the map 50 may be binarized or converted into N values based on a depth before undergoing labeling processing, or a spatially continuous area with substantially the same or continuous depth may be extracted.

In step S401, the image processor 11 superimposes an edge 52 obtained in the edge detection (step S205 in FIG. 2) on the area 51 extracted from the map 50. The image processor 11 then divides the area 51 by the edge 52 into divisions 53*a* to 53*c* (step S402) and calculates the area (the number of pixels) S of each division (step S403).

In step S404, the image processor 11 compares the area S of each of the divisions 53*a* to 53*c* with a predetermined threshold X and determines the divisions 53*a* and 53*c* with areas S smaller than the threshold X as measurement errors. In step S405, the image processor 11 corrects the map 50 to remove the divisions 53*a* and 53*c* determined as measurement errors and outputs a corrected map 54. The removal of the divisions may be, for example, the operation of replacing the depth values of the pixels in the divisions with the depth values of the background area. For a map 50 that is point cloud data (or a set of points with depth information), the removal may be the operation of deleting the point cloud in the divisions. The processing eliminates or reduces the measurement error caused by false pattern recognition.

First Embodiment

Figure 6:
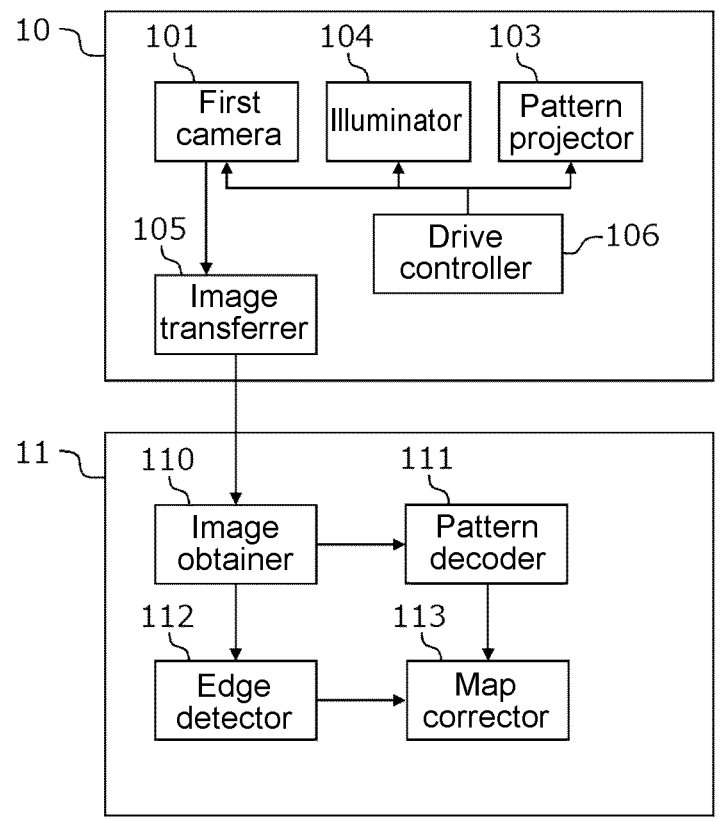
FIG. 6 is a functional block diagram of a 3D measurement system according to a first embodiment of the present invention.

The 3D measurement system 1 according to a first embodiment of the present invention will now be described with reference to FIG. 6. In the first embodiment, a spatially encoded pattern technique is used to generate 3D information about the target object 12.

(Sensor Unit)

The sensor unit 10 includes a first camera 101, a pattern projector (first projector) 103, an illuminator (second projector) 104, an image transferrer 105, and a drive controller 106.

The first camera 101 is an imaging device for imaging the target object 12 to obtain image data. The first camera 101 may be a monochrome or color camera.

Figure 7:
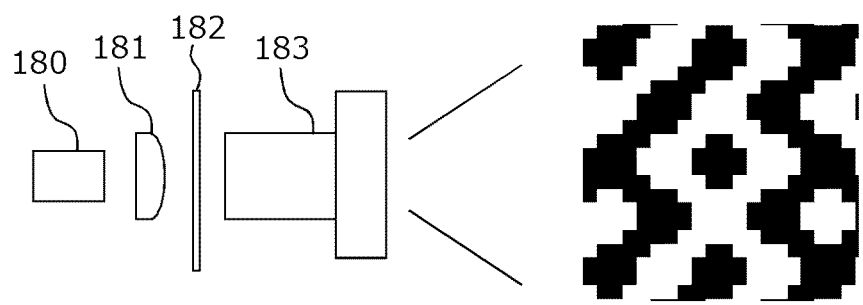
FIG. 7 is a diagram of an example pattern projector.

The pattern projector 103 projects patterned light onto the target object 12 for ranging with the spatially encoded pattern technique. In ranging with the spatially encoded pattern technique, for example, a regular pattern (encoded pattern) is used to determine the distance. FIG. 7 schematically shows an example of the pattern projector 103. The pattern projector 103 includes, for example, a light source 180, a light guide lens 181, a pattern generator 182, and a projection lens 183. The light source 180 may include a light-emitting diode (LED), a laser, or a vertical-cavity surface-emitting laser (VCSEL). The light guide lens 181 is an optical element for guiding light from the light source 180 to the pattern generator 182 and may include a lens or a glass rod. The pattern generator 182 is a member or a device for generating a combined pattern and may include a photomask, a diffractive optical element (DOE), an optical modulator such as digital light processing (DLP), a liquid crystal display (LCD), liquid crystal on silicon (LCoS), or microelectromechanical systems (MEMS). The projection lens 183 is an optical element for magnifying and projecting the generated pattern.

The illuminator 104 is a uniform illuminator usable for capturing typical visible light images. The illuminator 104 may be, for example, a white LED illuminator or an illuminator having the same wavelength band as the pattern projector 103.

The image transferrer 105 transfers data about the image captured with the first camera 101 to the image processor 11. The drive controller 106 controls the first camera 101, the pattern projector 103, and the illuminator 104. The image transferrer 105 and the drive controller 106 may be included in the image processor 11, rather than in the sensor unit 10.

(Image Processor)

The image processor 11 includes an image obtainer 110, a pattern decoder (map generator) 111, an edge detector (edge detector) 112, and a map corrector (corrector) 113.

The image obtainer 110 receives image data to be used from the sensor unit 10. The image obtainer 110 transmits an image captured with patterned light projected (patterned image) to the pattern decoder 111 and transmits an image captured with unpatterned light projected (unpatterned image) to the edge detector 112. The pattern decoder 111 obtains depth information from the patterned image with the spatially encoded pattern technique. The pattern decoder 111 outputs a depth map. The edge detector 112 detects the edge of the target object 12 from the unpatterned image. The map corrector 113 corrects the depth map based on the detected edge and outputs the corrected depth map. The depth map is used for, for example, shape recognition or object recognition for the target object 12.

The image processor 11 is, for example, a computer including a central processing unit (CPU), a random-access memory (RAM), a nonvolatile storage (e.g., a hard disk drive, or a solid-state drive or SSD), an input device, and an output device. In this case, the CPU loads the program stored in the nonvolatile storage into the RAM and executes the program to implement various functions described above. The image processor 11 may have any other configuration. The above functions may be entirely or partly implemented by a dedicated circuit such as a field-programmable gate array (FPGA) or an application-specific integrated circuit (ASIC), or by cloud computing or distributed computing. The same applies to embodiments described below.

In the present embodiment described above, the spatially encoded pattern technique allows high-speed and accurate 3D measurement. Additionally, the depth map is corrected based on the position of the edge detected from the unpatterned image. This eliminates or reduces the measurement error caused by false pattern recognition, thus producing a more accurate depth map.

Second Embodiment

Figure 8:
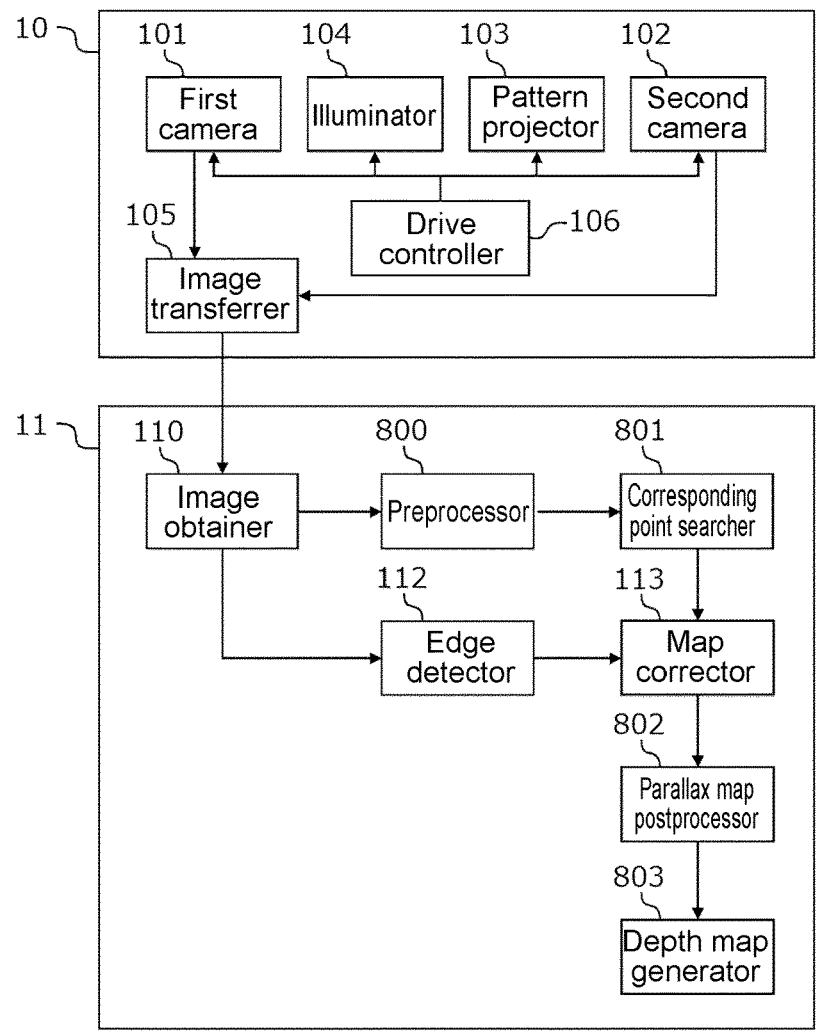
FIG. 8 is a functional block diagram of a 3D measurement system according to a second embodiment of the present invention.

A 3D measurement system 1 according to a second embodiment of the present invention will now be described with reference to FIG. 8. In the second embodiment, stereo matching is used to generate 3D information about a target object 12.

(Sensor Unit)

A sensor unit 10 includes a first camera 101, a second camera 102, a pattern projector (first projector) 103, an illuminator (second projector) 104, an image transferrer 105, and a drive controller 106.

The first camera 101 and the second camera 102 are a pair of cameras to form a stereo camera and are spaced from each other by a predetermined distance. The cameras 101 and 102 can simultaneously perform imaging to produce a pair of images captured from different viewpoints (the image captured with the first camera 101 is referred to as a first image, and the image captured with the second camera 102 is referred to as a second image). The cameras 101 and 102 may be arranged to have optical axes crossing each other and have horizontal (or vertical) lines flush with each other. This arrangement allows the epipolar line to be parallel to horizontal (or vertical) lines in images. A corresponding point can be searched for on a horizontal (or vertical) line at the corresponding position in stereo matching, thus simplifying the search process. The cameras 101 and 102 may be monochrome or color cameras.

The pattern projector 103 projects patterned light onto the target object 12 for active stereo ranging. In active stereo ranging, for example, a regular pattern (encoded pattern) may be used to determine the distance as in the first embodiment, or an irregular pattern such as a random-dot pattern may be used. The illuminator 104 performs uniform illumination usable for capturing typical visible light images. The pattern projector 103 and the illuminator 104 may have the same specific structures as in the first embodiment.

The image transferrer 105 transfers data about the first image captured with the first camera 101 and data about the second image captured with the second camera 102 to an image processor 11. The image transferrer 105 may transfer the first and second images as separate pieces of image data, or may transfer the first and second images as a single piece of image data by joining the first and second images into a side-by-side image. The drive controller 106 controls the first camera 101, the second camera 102, the pattern projector 103, and the illuminator 104. The image transferrer 105 and the drive controller 106 may be included in the image processor 11, rather than in the sensor unit 10.

(Image Processor)

The image processor 11 includes an image obtainer 110, a preprocessor 800, a corresponding point searcher (map generator) 801, an edge detector (edge detector) 112, a map corrector (corrector) 113, a parallax map postprocessor 802, and a depth map generator 803.

The image obtainer 110 transmits the first and second images or a pair of stereo images captured with projected patterned light to the preprocessor 800 and transmits an image captured with projected unpatterned light to the edge detector 112. The preprocessor 800 performs preprocessing on the first and second images as appropriate. The corresponding point searcher 801 searches for corresponding points between the first and second images and generates a parallax map based on the search results. The edge detector 112 detects the edge of the target object 12 from the unpatterned image. The map corrector 113 corrects the parallax map based on the detected edge and outputs the corrected parallax map. The parallax map postprocessor 802 performs postprocessing on the parallax map as appropriate.

The depth map generator 803 converts parallax information in the parallax map into distance information to generate a depth map.

(Map Generation)

Figure 9:
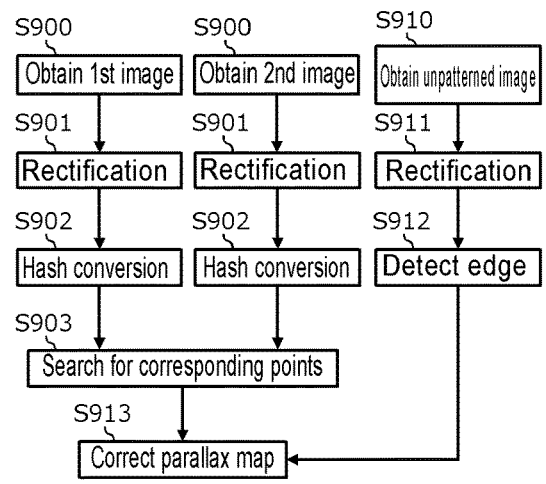
FIG. 9 is a flowchart of a measurement process according to the second embodiment.

The map generation process in the second embodiment will now be described with reference to FIG. 9. FIG. 9 is a flowchart of the details of steps S202, S205, and S206 in FIG. 2.

In step S900, the image obtainer 110 obtains the first and second images from the sensor unit 10. The first and second images are respectively captured with the first and second cameras 101 and 102 with patterned light projected from the pattern projector 103 onto the target object 12. In response to receiving data representing a side-by-side image from the sensor unit 10, the image obtainer 110 divides the side-by-side image into the first and second images. The image obtainer 110 transmits the first and second images to the preprocessor 800.

In step S901, the preprocessor 800 rectifies the first and second images (rectification). Rectification is geometric transformation of either or both of the two images to cause the corresponding points between the images to be located on the same horizontal (or vertical) line. Rectification causes the epipolar line to be parallel to horizontal (or vertical) lines in images, thus facilitating the search for the corresponding points performed subsequently. For images received from the sensor unit 10 being sufficiently parallel, the rectification in step S901 may be eliminated.

In step S902, the preprocessor 800 calculates a hash feature quantity for each pixel in the rectified first and second images and replaces each pixel value with the corresponding hash feature quantity. The hash feature quantity represents the luminance feature of a local area at and around a target pixel and is indicated by an 8-bit string. Converting the luminance value of each pixel into a hash feature quantity allows efficient calculation of the degree of similarity in the local luminance feature in the search for corresponding points to be performed later.

In step S903, the corresponding point searcher 801 searches for corresponding points between the first and second images and determines parallaxes for the pixels. The corresponding point searcher 801 generates parallax data including successfully detected corresponding points (the coordinates of pixels) each associated with parallax information. This information is a parallax map.

In step S910, the image obtainer 110 obtains the unpatterned image from the sensor unit 10. The unpatterned image is captured with the first or second camera 101 or 102 with unpatterned light (e.g., uniform illumination) projected from the illuminator 104 onto the target object 12.

In step S911, the edge detector 112 rectifies the unpatterned image (rectification). For images being sufficiently parallel, the rectification may be eliminated. In step S912, the edge detector 112 detects the edge of the target object 12 from the unpatterned image.

In step S913, the map corrector 113 corrects the parallax map generated in step S903 based on the edge detected in step S912. The details of the map correction process are shown in FIG. 4.

(Postprocessing)

Figure 10:
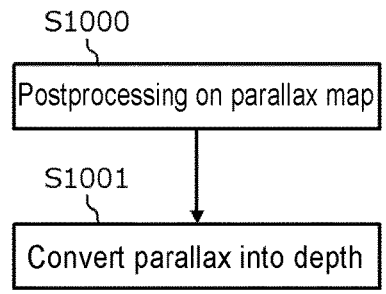
FIG. 10 is a flowchart of a postprocessing process according to the second embodiment.

The postprocessing process in the second embodiment will now be described with reference to FIG. 10. FIG. 10 is a flowchart of the details of step S207 in FIG. 2.

In step S1000, the parallax map postprocessor 802 performs postprocessing on the parallax map. The parallax map estimated through the search for corresponding points may include erroneously measured or omitted measured points. Such points are corrected or supplemented in the postprocessing performed based on the parallax information about the adjacent pixels.

In step S1001, the depth map generator 803 converts the parallax information about each pixel in the parallax map into depth information to generate a depth map. The depth map (point cloud data) is used for, for example, shape recognition or object recognition for the target object 12.

In the present embodiment described above, stereo matching allows accurate 3D measurement with high spatial resolution. Additionally, the correction in the parallax map based on the position of the edge detected from the unpatterned image eliminates or reduces the measurement error caused by false pattern recognition, thus producing a more accurate parallax map. In the present embodiment, the parallax map undergoes the map correction process. However, the parallax map may be converted into a depth map, which may then undergo the map correction process.

Third Embodiment

Figure 11:
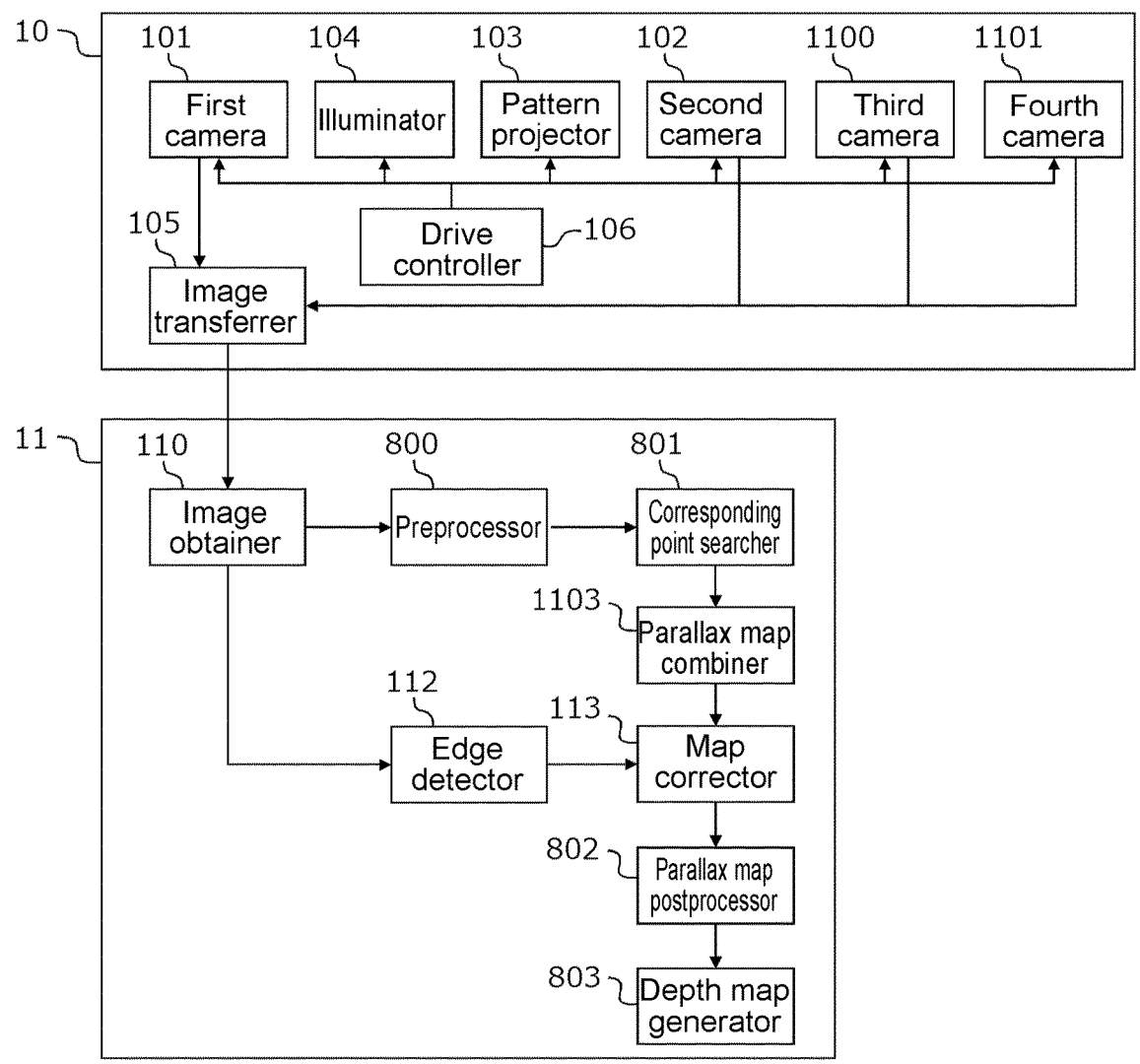
FIG. 11 is a functional block diagram of a 3D measurement system according to a third embodiment of the present invention.

A 3D measurement system 1 according to a third embodiment of the present invention will now be described with reference to FIG. 11. In the third embodiment, stereo matching is performed on multiple image pairs, and the parallax maps generated from the image pairs are combined to improve the measurement accuracy and robustness. Components different from those in the second embodiment will now be described mainly, and the same components as in the second embodiment will not be described.

(Sensor Unit)

A sensor unit 10 includes a first camera 101, a second camera 102, a third camera 1100, a fourth camera 1101, a pattern projector (first projector) 103, an illuminator (second projector) 104, an image transferrer 105, and a drive controller 106. The sensor unit 10 in the present embodiment includes the four cameras, which can simultaneously capture images from four viewpoints per projection.

The third camera 1100 and the fourth camera 1101 are a pair of cameras to form a stereo camera and are spaced from each other by a predetermined distance (the image captured with the third camera 1100 is referred to as a third image, and the image captured with the fourth camera 1101 is referred to as a fourth image). The cameras 1100 and 1101 may be arranged to have optical axes crossing each other and have horizontal (or vertical) lines flush with each other. This arrangement allows the epipolar line to be parallel to horizontal (or vertical) lines in images. A corresponding point can be searched for on a horizontal (or vertical) line at the corresponding position in stereo matching, simplifying the search process. The cameras 1100 and 1101 may be monochrome or color cameras.

The image transferrer 105 transfers data about the first to fourth images captured with the first to fourth cameras 101 to 1101 to an image processor 11. The image transferrer 105 may transfer the first to fourth images as separate pieces of image data or may transfer the first to fourth images as a single piece of image data by joining the first to fourth images into a side-by-side image.

(Image Processor)

The image processor 11 includes an image obtainer 110, a preprocessor 800, a corresponding point searcher (map generator) 801, a parallax map combiner (parallax map combiner) 1103, an edge detector (edge detector) 112, a map corrector (corrector) 113, a parallax map postprocessor 802, and a depth map generator 803. The parallax map combiner 1103 combines multiple parallax maps generated from multiple image pairs to generate a combined parallax map.

(Map Generation)

Figure 12:
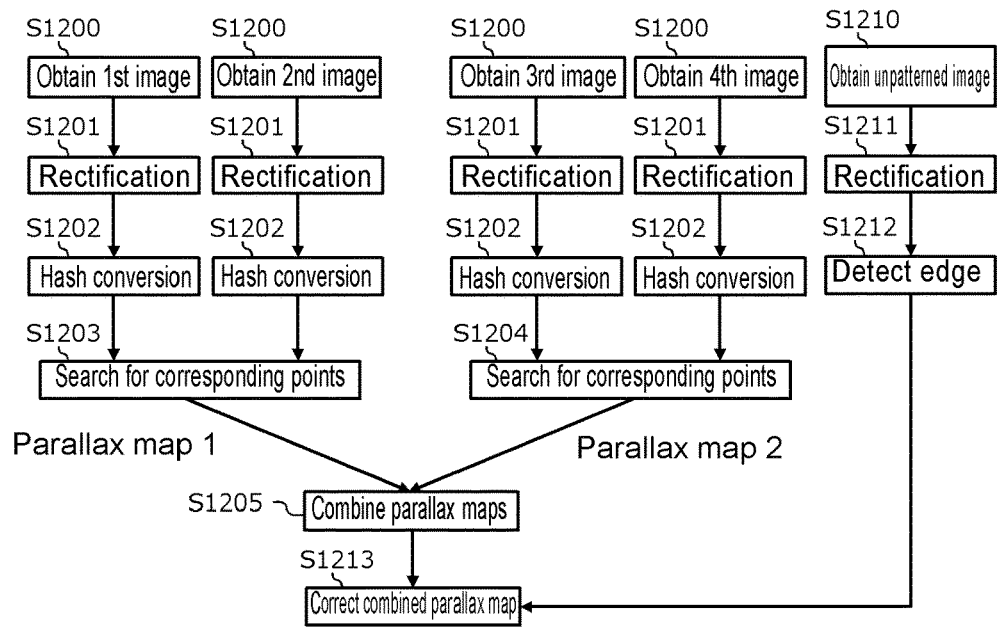
FIG. 12 is a flowchart of a measurement process according to the third embodiment.

The map generation process in the third embodiment will now be described with reference to FIG. 12. FIG. 12 is a flowchart of the details of steps S202, S205, and S206 in FIG. 2.

In step S1200, the image obtainer 110 obtains the first to fourth images from the sensor unit 10. The first to fourth images are respectively captured with the first camera 101, the second camera 102, the third camera 1100, and the fourth camera 1101 with patterned light projected from the pattern projector 103 onto a target object 12. In response to receiving data representing a side-by-side image from the sensor unit 10, the image obtainer 110 divides the side-by-side image into the first to fourth images. In the present embodiment, the first and second images are used as a first image pair, and the third and fourth images are used as a second image pair for stereo matching.

In step S1201, the preprocessor 800 rectifies the first to fourth images (rectification). In step S1202, the preprocessor 800 calculates a hash feature quantity for each pixel in the rectified first to fourth images and replaces each pixel value with the corresponding hash feature quantity.

In step S1203, the corresponding point searcher 801 searches for corresponding points between the first and second images or the first image pair and generates a parallax map 1. In step S1204, the corresponding point searcher 801 searches for corresponding points between the third and fourth images or the second image pair and generates a parallax map 2.

In step S1205, the parallax map combiner 1103 combines the parallax map 1 obtained from the first image pair and the parallax map 2 obtained from the second image pair to generate a combined parallax map. Any combination method may be used. For example, for both the parallax maps 1 and 2 having parallaxes, the average parallax value may be used as a combined parallax. For any one of the parallax maps 1 and 2 having a parallax, the parallax value may be directly used as a combined parallax.

In step S1210, the image obtainer 110 obtains the unpatterned image from the sensor unit 10. The unpatterned image is captured with the first or second camera 101 or 102 with unpatterned light (e.g., uniform illumination) projected from the illuminator 104 onto the target object 12.

In step S1211, the edge detector 112 rectifies the unpatterned image (rectification). For images being sufficiently parallel, the rectification may be eliminated. In step S1212, the edge detector 112 detects the edge of the target object 12 from the unpatterned image.

In step S1213, the map corrector 113 corrects, based on the edge detected in step S1212, the combined parallax map generated in step S1205. The details of the map correction process are shown in FIG. 4.

In the present embodiment described above, the combination of the parallax maps obtained from the multiple image pairs can reduce variations in measurement. This allows stable generation of a map more accurate and reliable than the map in the second embodiment.

In the present embodiment, the combined parallax map undergoes the map correction process. However, the combined parallax map may be converted into a depth map, which may then undergo the map correction process. Although the two image pairs are used in the present embodiment, three or more image pairs may be used. The same image may be included in two or more image pairs. For example, the first to third images may be used to form three image pairs, which are a pair of first and second images, a pair of first and third images, and a pair of second and third images. The image pairs may be captured in different conditions. In the present embodiment, for example, the exposure time for the first and second cameras may differ from the exposure time for the third and fourth cameras. This produces effects similar to high dynamic range (HDR) imaging, improving the measurement robustness. Instead of two pairs of stereo cameras as used in the present embodiment, one pair of stereo cameras may perform imaging multiple times to obtain multiple image pairs. In this case as well, the measurement robustness can be improved by changing the imaging conditions (e.g., exposure times or times of illumination with patterned light) each time imaging is performed.

Additionally, when unpatterned light is projected, multiple cameras may simultaneously perform imaging to capture multiple unpatterned images, and the edge information detected from each unpatterned image may be combined to generate accurate edge information. The edge information with improved accuracy further improves the accuracy and reliability of the corrected map.

Fourth Embodiment

Figure 13:
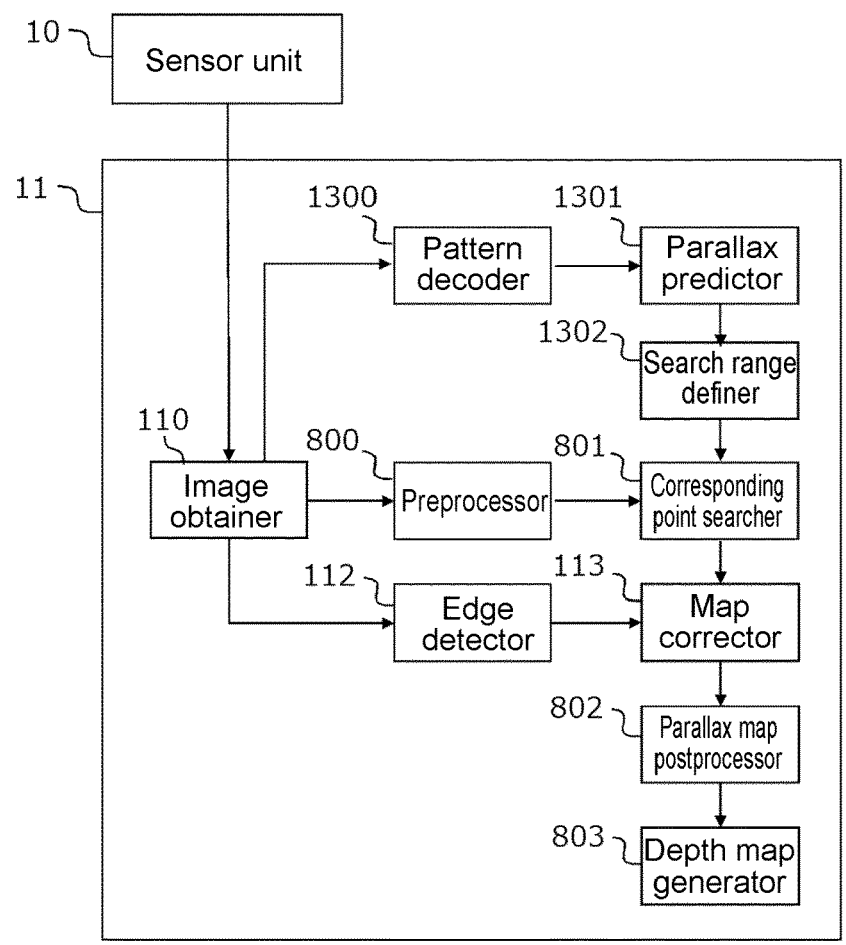
FIG. 13 is a functional block diagram of a 3D measurement system according to a fourth embodiment of the present invention.

A 3D measurement system 1 according to a fourth embodiment of the present invention will now be described with reference to FIG. 13. In the fourth embodiment, a spatially encoded pattern technique and stereo matching are combined to produce 3D information about a target object 12 quickly and accurately.

A sensor unit 10 may have the same configuration as in the second embodiment. An image processor 11 includes an image obtainer 110, a pattern decoder 1300, a parallax predictor 1301, a preprocessor 800, a search range definer 1302, a corresponding point searcher 801, an edge detector (edge detector) 112, a map corrector (corrector) 113, a parallax map postprocessor 802, and a depth map generator 803. The pattern decoder 1300 obtains distance information from the first image with the spatially encoded pattern technique. The parallax predictor 1301 predicts a parallax between the first and second images based on the distance information obtained by the pattern decoder 1300, and outputs a reference parallax map. The search range definer 1302 defines search ranges for corresponding points based on the predicted parallax. The other components are substantially the same as in the second embodiment and will not be described.

(Map Generation)

Figure 14:
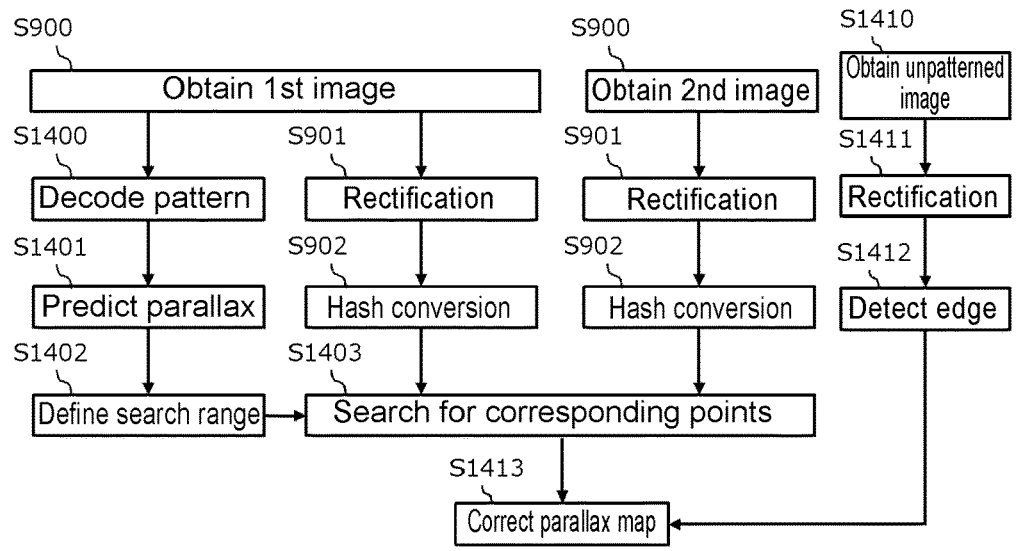
FIG. 14 is a flowchart of a measurement process according to the fourth embodiment.

The map generation process in the fourth embodiment will now be described with reference to FIG. 14. FIG. 14 is a flowchart of the details of steps S202, S205, and S206 in FIG. 2. The same processing as in the map generation process in the second embodiment (FIG. 9) is given the same step number and will not be described in detail.

In step S900, the image obtainer 110 obtains the first and second images from the sensor unit 10. In step S901, the preprocessor 800 rectifies the first and second images (rectification). In step S902, the preprocessor 800 calculates a hash feature quantity for each pixel in the rectified first and second images and replaces each pixel value with the corresponding hash feature quantity.

In step S1400, the pattern decoder 1300 analyzes the first image and decodes the pattern to obtain distance information in the depth direction for multiple points on the first image.

In step S1401, the parallax predictor 1301 calculates two-dimensional (2D) coordinates resulting from projection of a point onto an image coordinate system for the rectified first image and calculates 2D coordinates resulting from projection of the same point onto an image coordinate system for the rectified second image based on the distance information about the point obtained in step S1400. The parallax predictor 1301 then calculates the difference in coordinates between the two images. The difference is a predicted parallax. The parallax predictor 1301 determines predicted parallaxes for all the points for which distance information is obtained in step S1400 and outputs the data as a reference parallax map.

In step S1402, the search range definer 1302 defines search ranges for corresponding points for the first and second images based on the predicted parallax. The search ranges are determined by reflecting prediction errors. For a prediction error being ±10 pixels, for example, a search range of about ±20 pixels around the predicted parallax may be sufficient with a margin included. For a horizontal line including 640 pixels, the search range narrowed to ±20 pixels (or in other words, 40 pixels) is simply 1/16 of the range for searching the entire horizontal line.

In step S1403, the corresponding point searcher 801 searches for corresponding points between the first and second images within the defined search range and determines parallaxes for the pixels. The corresponding point searcher 801 generates parallax data including successfully detected corresponding points (the coordinates of pixels) each associated with parallax information. This information is a parallax map.

In step S1410, the image obtainer 110 obtains the unpatterned image from the sensor unit 10. The unpatterned image is captured with a first or second camera 101 or 102 with unpatterned light (e.g., uniform illumination) projected from an illuminator 104 onto the target object 12.

In step S1411, the edge detector 112 rectifies the unpatterned image (rectification). For images being sufficiently parallel, the rectification may be eliminated. In step S1412, the edge detector 112 detects the edge of the target object 12 from the unpatterned image.

In step S1413, the map corrector 113 corrects, based on the edge detected in step S1412, the parallax map generated in step S1403. The details of the map correction process are shown in FIG. 4.

In the present embodiment described above, the search ranges for corresponding points are limited based on a predicted parallax. This greatly narrows the search ranges and shortens the time taken for the search for corresponding points. The limitation also increases the success rate and the accuracy of stereo matching, or specifically the search for corresponding points. The system in the present embodiment thus allows high-speed and accurate 3D measurement with high spatial resolution.

In the present embodiment, ranging with the spatially encoded pattern technique is performed to predict a parallax. However, instead of the spatially encoded pattern technique, another technique that allows ranging or parallax prediction to be performed more quickly than stereo matching may be used for ranging or parallax prediction. Examples of ranging or parallax prediction techniques include time-coded pattern projection, moire topography (contour mapping), photometric stereo (illumination direction), illuminance difference, laser confocal, white light confocal, optical interferometry, shape from silhouette, factorization, depth from motion (structure from motion), depth from shading, depth from focusing, depth from defocus, depth from zoom, direct time of flight (dToF), and indirect time of flight (iToF) techniques. In the present embodiment, the parallax map undergoes the map correction process. However, the parallax map may be converted into a depth map, which may then undergo the map correction process.

Additionally, the features described in the third embodiment (e.g., the accuracy of a parallax map improved using multiple image pairs, and the accuracy of edge information improved using multiple unpatterned images) may be combined in the fourth embodiment.

Fifth Embodiment

Figure 15:
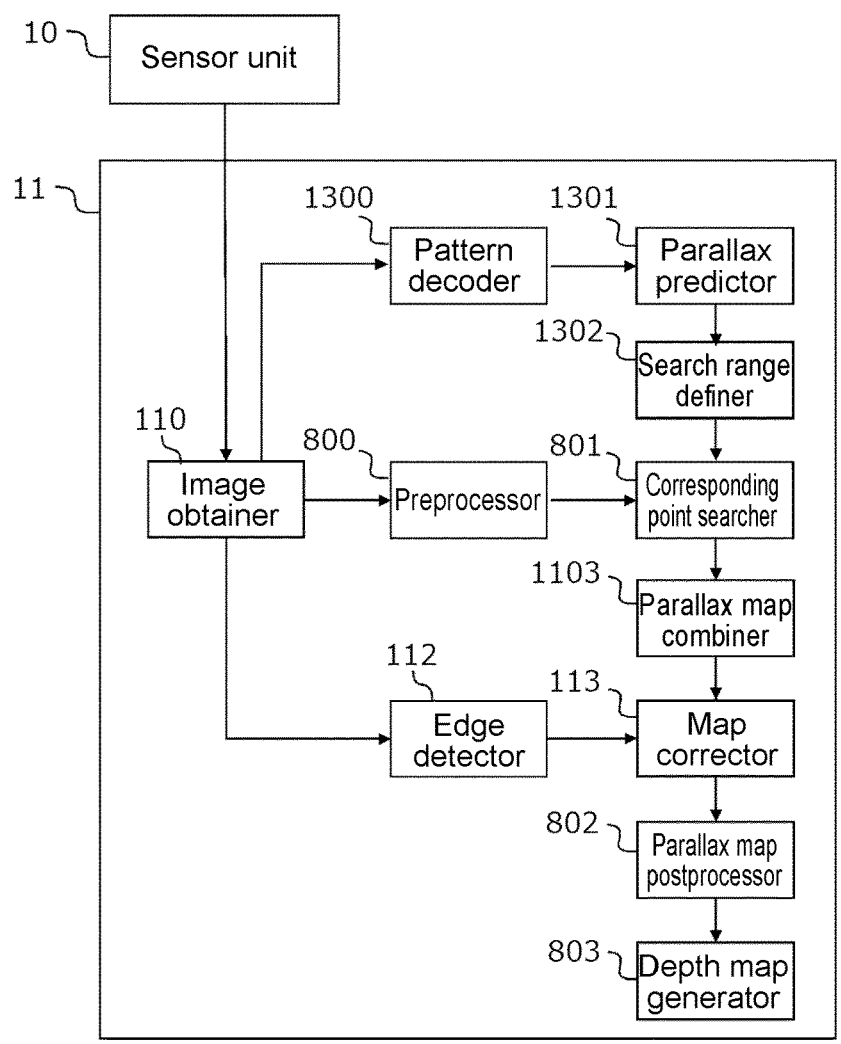
FIG. 15 is a functional block diagram of a 3D measurement system according to a fifth embodiment of the present invention.

A 3D measurement system 1 according to a fifth embodiment of the present invention will now be described with reference to FIG. 15. The fifth embodiment is a modification of the method in the fourth embodiment (the combination of the spatially encoded pattern technique and stereo matching). The generation of a predicted parallax and stereo matching (the generation of a parallax map) are each performed multiple times to further improve the measurement accuracy and robustness. Components different from those in the fourth embodiment will now be described mainly, and the same components as in the fourth embodiment will not be described.

A sensor unit 10 may have the same configuration as in the fourth embodiment. An image processor 11 includes an image obtainer 110, a pattern decoder 1300, a parallax predictor 1301, a preprocessor 800, a search range definer 1302, a corresponding point searcher 801, a parallax map combiner 1103, an edge detector (edge detector) 112, a map corrector (corrector) 113, a parallax map postprocessor 802, and a depth map generator 803. The parallax map combiner 1103 combines multiple parallax maps generated from multiple image pairs to generate a combined parallax map.

(Map Generation)

Figure 16:
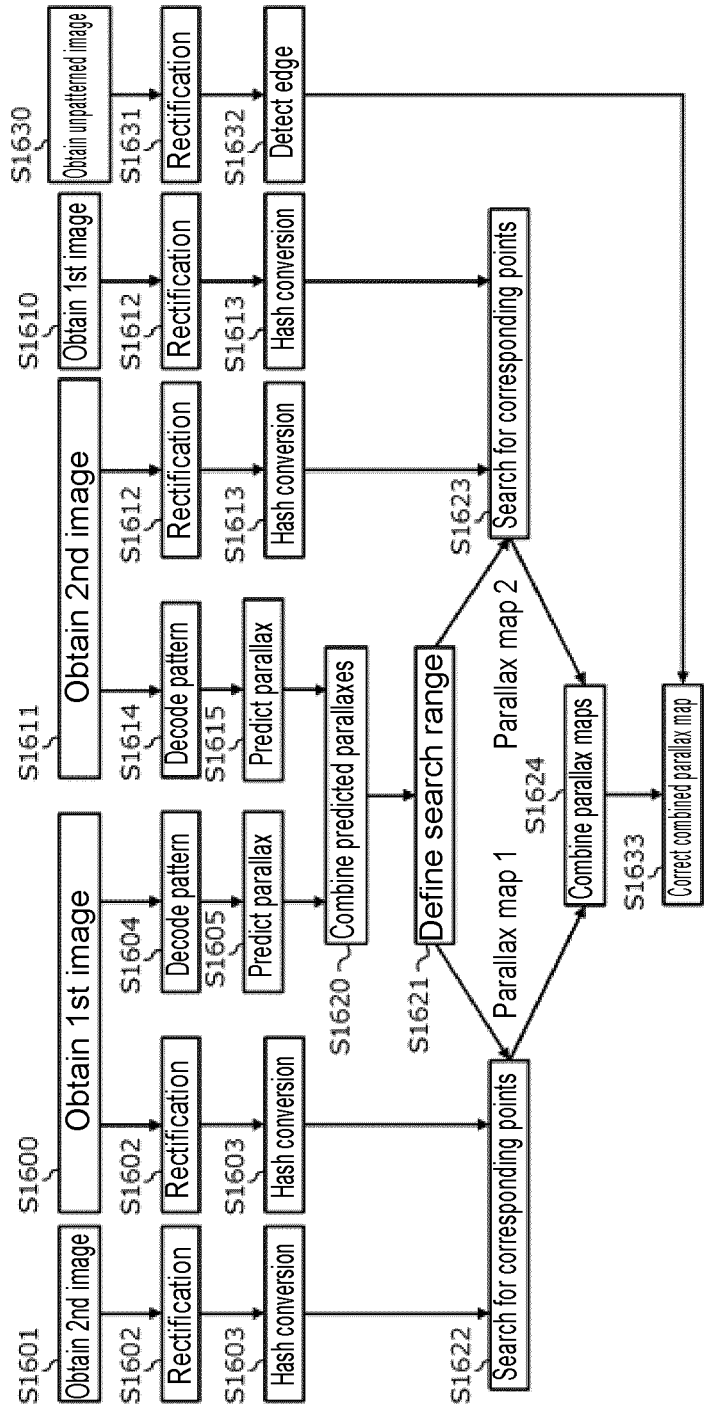
FIG. 16 is a flowchart of a measurement process according to the fifth embodiment.
Figure 17:
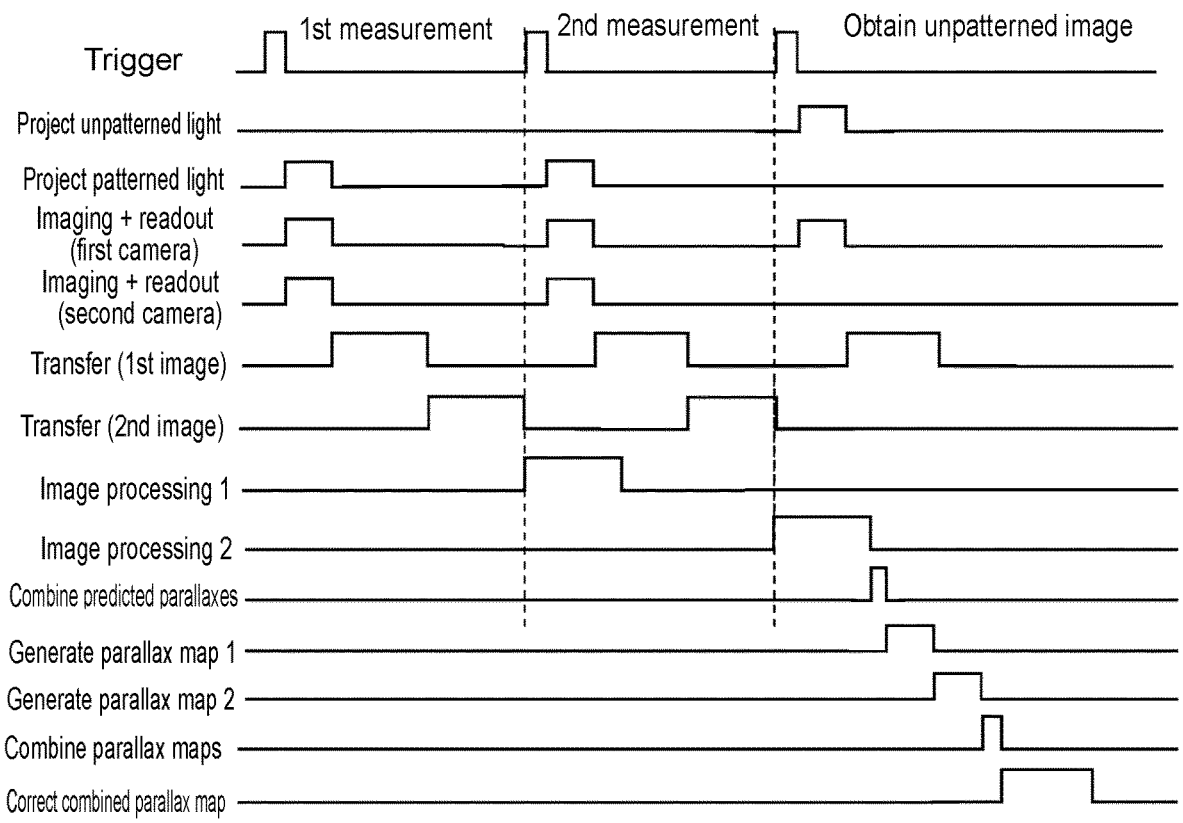
FIG. 17 is a timing chart of the measurement process according to the fifth embodiment.
Figure 18:
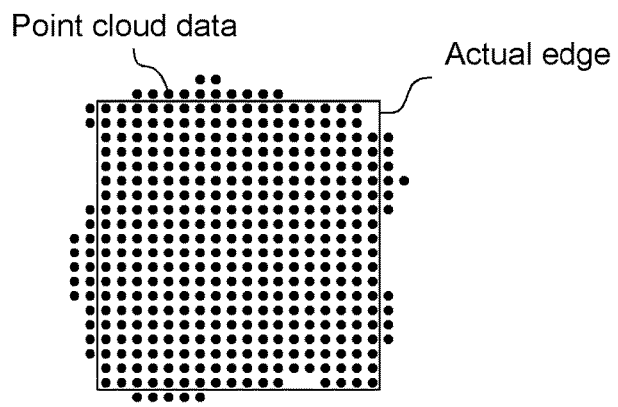
FIG. 18 is a schematic diagram showing the discrepancy between 3D information (point cloud data) obtained by active measurement and the edge (contour) of the actual object.

The map generation process in the fifth embodiment will now be described with reference to FIGS. 16 and 17. FIG. 16 is a flowchart of the details of steps S202, S205, and S206 in FIG. 2. FIG. 17 is a timing chart.

In response to a start signal from a drive controller 106 as a trigger, the first measurement is performed. The pattern projector 103 first lights and projects predetermined patterned illumination onto a target object 12. First and second cameras 101 and 102 then simultaneously perform imaging. An image transferrer 105 then transfers the first and second images. In steps S1600 and S1601, the image obtainer 110 obtains the first and second images or a first image pair. The image obtainer 110 transmits the first image to the pattern decoder 1300 and transmits the first and second images to the preprocessor 800.

In response to a start signal from the drive controller 106 as a trigger, the second measurement is performed. The pattern projector 103 first lights and projects predetermined patterned illumination onto the target object 12. The first and second cameras 101 and 102 then simultaneously perform imaging. The image transferrer 105 transfers the first and second images. In steps S1610 and S1611, the image obtainer 110 obtains the first and second images or a second image pair. The image obtainer 110 transmits the second image to the pattern decoder 1300 and transmits the first and second images to the preprocessor 800.

In parallel with the second measurement, image processing starts on the first image pair obtained by the first measurement. In step S1602, the preprocessor 800 rectifies the first and second images (rectification). In step S1603, the preprocessor 800 calculates a hash feature quantity for each pixel in the rectified first and second images and replaces each pixel value with the corresponding hash feature quantity.

In step S1604, the pattern decoder 1300 analyzes the first image and decodes the pattern to obtain distance information in the depth direction for multiple points on the first image.

In step S1605, the parallax predictor 1301 determines a predicted parallax based on the distance information about the point obtained in step S1604 and outputs the data as a reference parallax map. The processing on the first image may start upon completion of the transfer of the first image.

Upon completion of the transfer of the second image pair obtained by the second measurement, image processing starts on the second image pair. In step S1612, the preprocessor 800 rectifies the first and second images (rectification). In step S1613, the preprocessor 800 calculates a hash feature quantity for each pixel in the rectified first and second images and replaces each pixel value with the corresponding hash feature quantity. In step S1614, the pattern decoder 1300 analyzes the second image and decodes the pattern to obtain distance information based on the second image. In step S1615, the parallax predictor 1301 calculates a predicted parallax based on the distance information.

The predicted parallax obtained in the first measurement (step S1605) is theoretically the same as the predicted parallax obtained in the second measurement (step S1615). However, the predicted parallax in the first measurement and the predicted parallax in the second measurement are actually not the same. The first and second measurements use images captured with different cameras (viewpoints), causing a difference in appearance between the images (or image information). The difference may cause the first and second predicted parallax values to differ from each other, or cause parallax prediction to succeed in one measurement but to fail in the other measurement. In step S1620, the parallax predictor 1301 thus combines the first predicted parallax and the second predicted parallax to determine a combined predicted parallax. Any combination method may be used. For example, for predicted parallaxes obtained in both the first and second measurements, the average parallax value may be used as a combined predicted parallax. For a predicted parallax obtained in any one of the first and second measurements, the parallax value may be directly used as a combined predicted parallax.

In step S1621, the search range definer 1302 defines the search ranges for corresponding points for each of the first and second image pairs based on the combined predicted parallax.

In step S1622, the corresponding point searcher 801 searches for corresponding points between the images of the first image pair and determines parallaxes for the pixels, generating a parallax map 1. Similarly, in step S1623, the corresponding point searcher 801 searches for corresponding points between the images of the second image pair, generating a parallax map 2.

In step S1624, the parallax map combiner 1103 combines the parallax map 1 obtained from the first image pair and the parallax map 2 obtained from the second image pair to generate a combined parallax map. Any combination method may be used. For example, for both the parallax maps 1 and 2 having parallaxes, the average parallax value may be used as a combined parallax. For any one of the parallax maps 1 and 2 having a parallax, the parallax value may be directly used as a combined parallax.

In response to a start signal from the drive controller 106 as a trigger, an unpatterned image is captured. An illuminator 104 first lights and projects uniform illumination onto the target object 12. The first or second camera 101 or 102 performs imaging, and the image transferrer 105 transfers the unpatterned image (FIG. 17 shows a sequence in which the first camera captures the unpatterned image). In step S1630, the image obtainer 110 obtains the unpatterned image. The image obtainer 110 transmits the unpatterned image to the edge detector 112.

In step S1631, the edge detector 112 rectifies the unpatterned image (rectification). For images being sufficiently parallel, the rectification may be eliminated. In step S1632, the edge detector 112 detects the edge of the target object 12 from the unpatterned image.

In step S1633, the map corrector 113 corrects, based on the edge detected in step S1632, the combined parallax map generated in step S1624. The subsequent processing is the same as in the embodiments described above.

The configuration described in the present embodiment produces the same effects as in the fourth embodiment and also the advantages described below. First, the combination of the parallax maps obtained from the multiple image pairs reduces variations in measurement. Second, the parallax prediction from both the first and second images allows an accurate predicted parallax to be obtained. For any loss in the information about one image, the use of the other image is likely to allow prediction of a parallax. This allows more appropriate definition of search ranges for corresponding points, further improving the accuracy and robustness.

Modifications

The embodiments described above are mere examples of the present invention. The present invention is not limited to the embodiments described above, but may be modified variously within the scope of the technical ideas of the invention. In the above embodiments, for example, the target object 12 is illuminated with unpatterned light when an image for edge detection is captured. However, in a sufficiently bright environment, an image for edge detection may be captured without such dedicated illumination (or without emission of unpatterned light). More specifically, an image for edge detection may be any image captured with no ranging pattern projected, irrespective of whether unpatterned light is emitted when the image for edge detection is captured.

In the above embodiments, active measurement has been illustrated as three example methods, or the spatially encoded pattern technique (the first embodiment), the stereo matching (the second and third embodiments), and a hybrid of the spatially encoded pattern technique and the stereo matching (the fourth and fifth embodiments). However, the present invention is applicable to other active measurements. For example, a measurement section including one projector and one camera as in the first embodiment may use patterned light such as random-dot pattern, gray pattern, or time-encoded pattern light.

In the above embodiments, stereo matching uses hash feature quantities. However, any other method may be used for evaluating the degree of similarity in corresponding points. Example methods include using the sum of absolute differences (SAD) or sum of squared differences (SSD) as an evaluation index for the degree of similarity, and normalized correlation (NC) for calculating the degree of similarity in pixels in left and right images. In the above embodiments, the same camera images are used for predicting a parallax and for stereo matching. However, different camera images for 3D measurement may be used for these processes.

Appendix

An image processor (11), comprising:
a map generator (111; 801) configured to generate a map using an image captured with patterned light projected onto a target object (12), the map being data including pixels each associated with depth-related information;
an edge detector (112) configured to detect an edge of the target object (12) using an image captured without patterned light projected onto the target object (12); and
a corrector (113) configured to correct the map based on the detected edge to cause a discontinuous depth position to match a position of the edge of the target object (12).

REFERENCE SIGNS LIST three-dimensional (3D) measurement system
10 sensor unit
11 image processor
12 target object

The invention claimed is:

1. An image processor, comprising:
a map generator configured to generate a map using an image captured with patterned light projected onto a target object, the map being data including pixels each associated with depth-related information;
an edge detector configured to detect an edge of the target object using an image captured without patterned light projected onto the target object; and
a corrector configured to correct the map based on the detected edge to cause a discontinuous depth position to match a position of the edge of the target object, wherein
the map generator includes:
an obtainer configured to obtain an image pair of a first image and a second image captured from different viewpoints with patterned light projected onto the target object,
a parallax predictor configured to predict a parallax between the first image and the second image by a technique different from stereo matching,
a definer configured to define a search range for a corresponding point for stereo matching based on the predicted parallax, and
a stereo matcher configured to perform stereo matching for the defined search range using the first image and the second image to generate the map.

2. The image processor according to claim 1, wherein the corrector corrects the map by extracting an area corresponding to the target object from the map, dividing the area by the detected edge into a plurality of divisions, and removing, from the plurality of divisions, a division smaller than a predetermined threshold.

3. The image processor according to claim 1, wherein the parallax predictor predicts a parallax based on distance information obtained by a spatially encoded pattern technique.

4. The image processor according to claim 1, wherein the map generator further includes a parallax map combiner configured to generate a combined parallax map by combining a plurality of parallax maps generated by the stereo matcher from a plurality of image pairs.

5. The image processor according to claim 4, wherein the corrector corrects the combined parallax map, or a depth map resulting from conversion of the combined parallax map.

6. The image processor according to claim 4, wherein the parallax predictor generates a plurality of predicted parallaxes, and
the definer defines a search range for the plurality of image pairs using a combined predicted parallax including the plurality of predicted parallaxes combined together.

7. The image processor according to claim 1, wherein the image captured without patterned light projected onto the target object is an image captured with uniform light projected onto the target object.

8. A three-dimensional measurement system, comprising:
a sensor unit including at least a first projector configured to project patterned light and one or more cameras; and
the image processor according to claim 1 configured to perform processing using an image received from the sensor unit.

9. A non-transitory computer readable medium storing a program for causing a computer to function as each unit included in the image processor according to claim 1.

10. An image processing method, comprising:
obtaining an image pair of a first image and a second image captured from different viewpoints with patterned light projected onto a target object;
predicting a parallax between the first image and the second image by a technique different from stereo matching;
defining a search range for a corresponding point for stereo matching based on the predicted parallax;
performing stereo matching for the defined search range using the first image and the second image to generate a map, the map being data including pixels each associated with depth-related information;
detecting an edge of the target object using an image captured without patterned light projected onto the target object; and
correcting the map based on the detected edge to cause a discontinuous depth position to match a position of the edge of the target object.

* * * * *